United States Patent
Spjuth et al.

(10) Patent No.: US 12,288,357 B2
(45) Date of Patent: Apr. 29, 2025

(54) OBJECT AND FEATURE DETECTION IN IMAGES

(71) Applicant: Sony Group Corporation, Tokyo (JP)

(72) Inventors: Pär Spjuth, Basingstoke (GB); Sangxia Huang, Basingstoke (GB); Olivier Moliner, Basingstoke (GB); Rickard Andersson, Basingstoke (GB); Adam Jalkemo, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 386 days.

(21) Appl. No.: 17/751,483

(22) Filed: May 23, 2022

(65) Prior Publication Data
US 2022/0398772 A1 Dec. 15, 2022

(30) Foreign Application Priority Data
Jun. 11, 2021 (SE) .................................. 2150747-0

(51) Int. Cl.
G06T 7/73 (2017.01)
(52) U.S. Cl.
CPC ...... G06T 7/74 (2017.01); *G06T 2207/10021* (2013.01)
(58) Field of Classification Search
CPC . G06T 7/74; G06T 2207/10021; G06T 7/246; G06T 2207/10016; G06T 7/73
See application file for complete search history.

(56) References Cited

U.S. PATENT DOCUMENTS

| | | | |
|---|---|---|---|
| 2020/0184678 A1* | 6/2020 | Mukherjee | G06V 10/774 |
| 2021/0090284 A1* | 3/2021 | Ning | G06V 40/23 |
| 2023/0152084 A1* | 5/2023 | Fang | G06V 40/103 |
| | | | 348/135 |

FOREIGN PATENT DOCUMENTS

JP 2021105887 A 7/2021

OTHER PUBLICATIONS

Office Action and Search Report from corresponding Swedish Application No. 2150747-0, mailed on Feb. 24, 2022, 7 pages.
Rawal Khirodkar et al., "Multi-Hypothesis Pose Networks: Rethinking Top-Down Pose Estimation," Jan. 27, 2021, 16 pages.
Oh-Hun Kwon et al., "Recursive Bayesian Filtering for Multiple Human Pose Tracking from Multiple Cameras," Computer vision ECCV 2020, 16th European Conference vol. 27, Aug. 23-28, 2020, pp. 438-453.

(Continued)

*Primary Examiner* — Christopher M Brandt
(74) *Attorney, Agent, or Firm* — Tucker Ellis LLP

(57) ABSTRACT

A processing device is configured to obtain a sequence of images of a scene captured by an image sensor, determine an analysis area for an object in a respective image in the sequence of images, and process the respective image within the analysis area for detection of predefined features of the object. The processing device is further configured to receive pose prediction data, PPD, which represents predicted poses of the object as a function of time, and to determine the analysis area based on the PPD. The PPD may be given by three-dimensional poses of the object that have been determined in the system based on images from a plurality of image sensors in the system. The PPD facilitates detection of features of individual objects in the images even if the objects are occluded and/or crowded.

20 Claims, 10 Drawing Sheets

(56) References Cited

OTHER PUBLICATIONS

Junting Dong et al., "Fast and Robust Multi-Person 3D Pose Estimation from Multiple Views," 2019 IEEE/CVF Conference on Computer Vision and Pattern Recognition (CVPR), Jun. 2019, pp. 7784-7793.

Alessio Elmi et al., "Light3DPose: Real-time Multi-Person 3D Pose Estimation from Multiple Views," 2020 25th International Conference on Pattern Recognition (ICPR), Jan. 10-15, 2021, pp. 2755-2762.

* cited by examiner

| VIEW# | OBJECT# | KEYPOINT LOC |
|---|---|---|
| 1 | 1 | L1, L2, ..., L14 |
| 1 | 2 | L1, L2, ..., L14 |
| 1 | 3 | L1, L2, ..., L14 |
| 2 | 1 | L1, L2, ..., L14 |
| 2 | 2 | L1, L2, ..., L14 |
| 2 | 3 | L1, L2, ..., L14 |
| 3 | 1 | L1, L2, ..., L14 |
| 3 | 2 | L1, L2, ..., L14 |
| 3 | 3 | L1, L2, ..., L14 |

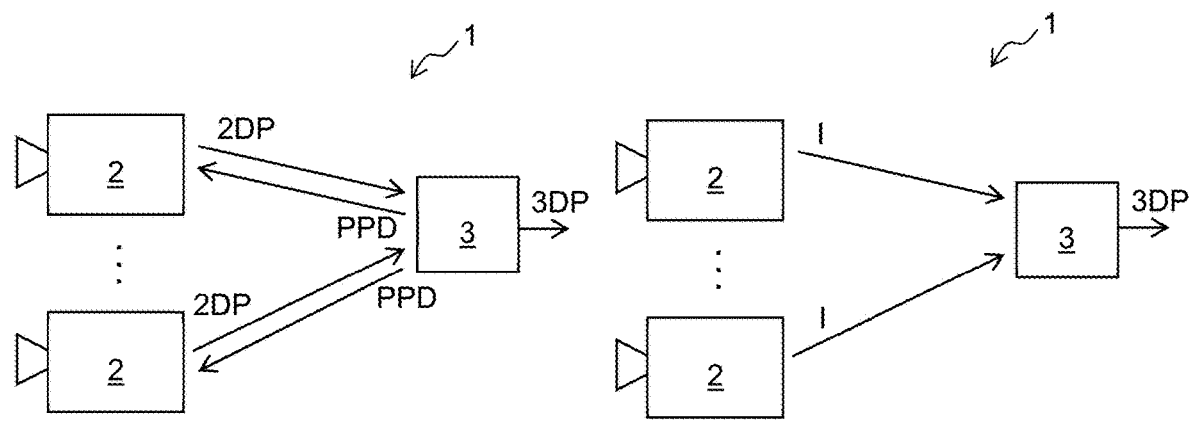
FIG. 3A
FIG. 3B
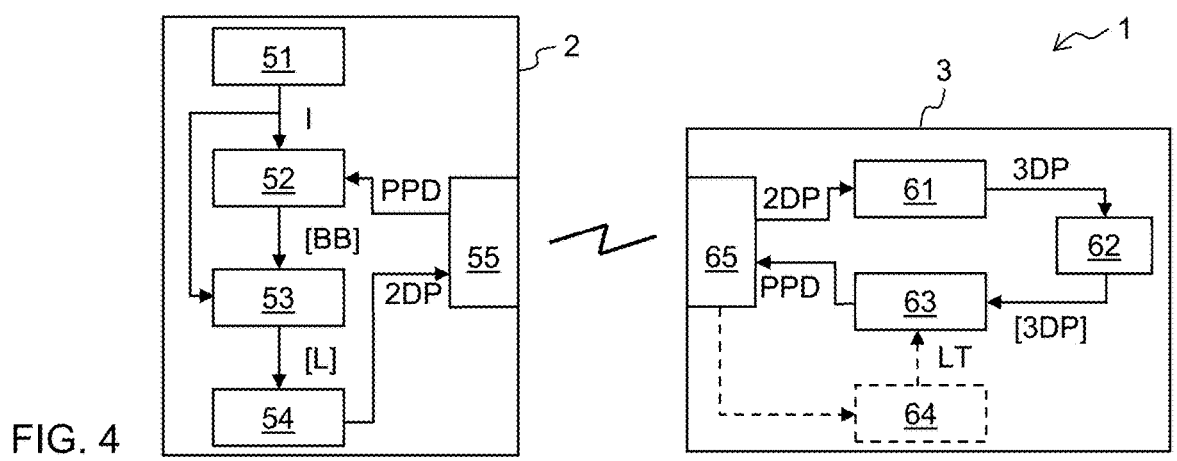
FIG. 4

OBJECT AND FEATURE DETECTION IN IMAGES

CROSS REFERENCE TO RELATED APPLICATIONS

The present application claims priority to Swedish Patent Application No. 2150747-0, filed Jun. 11, 2021, the content of which is incorporated herein by reference in its entirety.

TECHNICAL FIELD

The present disclosure relates generally to image processing for recognition and positioning and, in particular, to image processing for detection of predefined features of individual objects in image data for use in 3D pose reconstruction.

BACKGROUND ART

Feature detection of objects in images is an integral and important part of many image processing techniques. One such image processing technique is three-dimensional (3D) pose reconstruction based on two-dimensional (2D) images. The 2D images are at least partly overlapping and generated by image sensors that are arranged at different locations and/or with different orientations in relation to a scene. In a top-down approach of 3D pose reconstruction, object detection is first performed to detect and discriminate between individual objects in the 2D images, followed by feature detection for the respective object, whereupon the 3D pose of the respective object is determined by triangulation based on the locations of corresponding features of the same object in different 2D images. In a bottom-up approach, feature detection is first performed to detect predefined features irrespective of object, followed by association processing to assign detected features to objects, whereupon the 3D pose of the respective object is determined by triangulation based on the locations of corresponding features of the same object in different 2D images. Irrespective of approach, it is challenging to perform 3D pose reconstruction when objects are crowded and/or occluded in the 2D images, as well as when the 2D images include moderate or high levels of noise. There is thus a general need to improve accuracy of 3D pose reconstruction.

There is also a general need to increase the speed of 3D pose reconstruction, for example to enable real-time processing. Likewise, there is a general need to improve the power-efficiency of 3D pose reconstruction, for example to enable all or part of the 3D pose reconstruction to be performed by power-limited devices.

BRIEF SUMMARY

It is an objective to at least partly overcome one or more limitations of the prior art.

Another objective is to improve detection of features of objects in 2D images for use in 3D pose reconstruction.

Yet another objective is to enable at least one of increased processing speed and/or reduced power consumption of feature detection in 2D images when performed in accordance with the top-down approach.

One or more of these objectives, as well as further objectives that may appear from the description below, are at least partly achieved by processing devices, a system, methods, and a computer-readable medium according to the independent claims, embodiments thereof being defined by the dependent claims.

Still other objectives, as well as features, aspects and technical effects will appear from the following detailed description, from the attached claims as well as from the drawings.

BRIEF DESCRIPTION OF DRAWINGS

FIGS. 3A-3B are schematic illustrations of data transfer in example systems for 3D pose determination.

FIG. 4 is a functional block diagram of an imaging device and a central node in an example system.

DETAILED DESCRIPTION OF EXAMPLE EMBODIMENTS

Figures 1A, 1B:
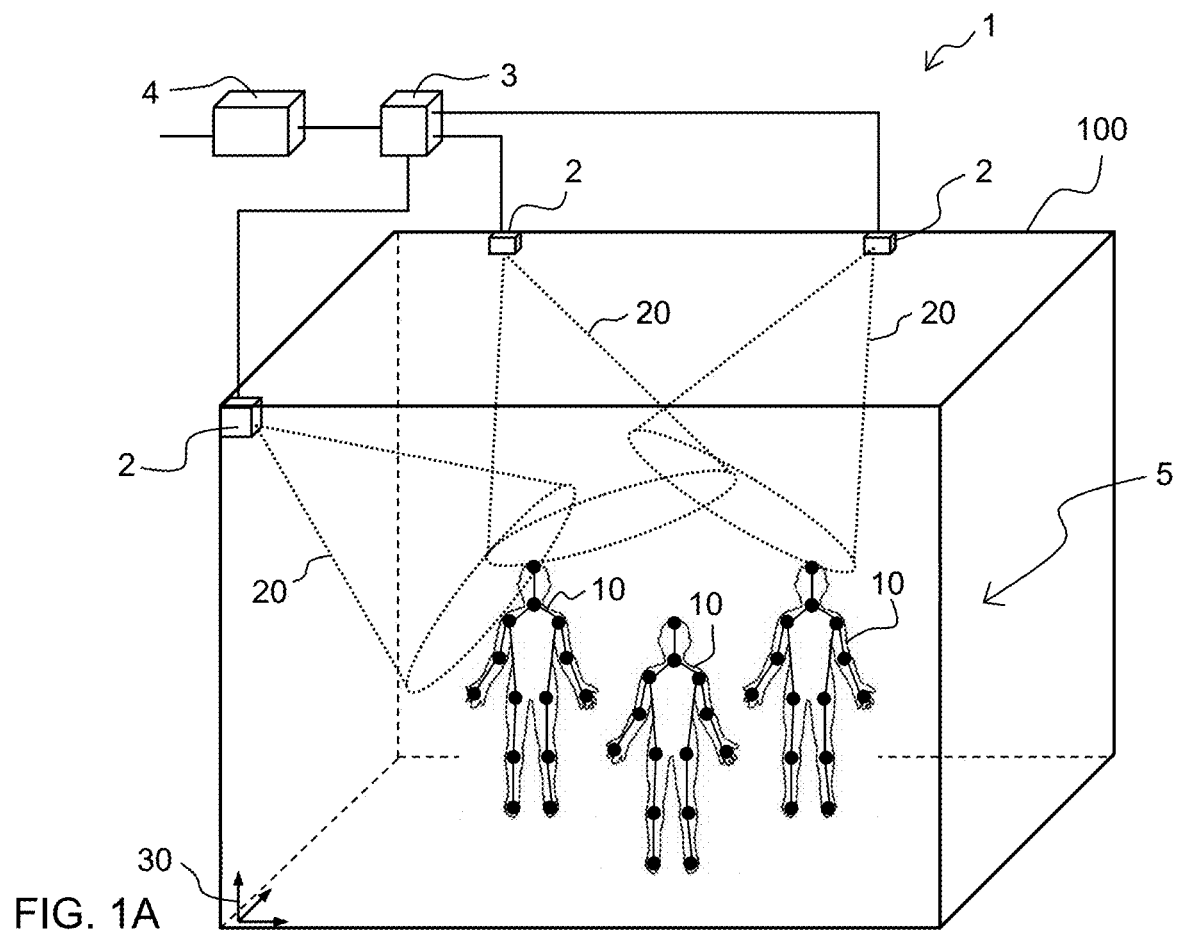
FIG. 1A is a perspective view of an installation of a monitoring system in a room, FIG. 1B exemplifies 2D pose data generated in the system, FIG. 1C exemplifies features detected for a human object.

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments. The term "compute", and derivatives thereof, is used in its conventional meaning and may be seen to involve performing a calculation involving one or more mathematical operations to produce a result, for example by use of a computer.

As used herein, the terms "multiple", "plural" and "plurality" are intended to imply provision of two or more elements, whereas the term a "set" of elements is intended to imply a provision of one or more elements. The term "and/or" includes any and all combinations of one or more of the associated listed elements.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure.

Well-known functions or constructions may not be described in detail for brevity and/or clarity. Unless otherwise defined, all terms (including technical and scientific terms) used herein have the same meaning as commonly understood by one of ordinary skill in the art to which this disclosure belongs.

Like numbers refer to like elements throughout.

Before describing embodiments in more detail, a few definitions will be given.

As used herein, "scene" denotes a three-dimensional (3D) space that is collectively monitored by two or more imaging devices. The imaging devices have at least partly overlapping fields of views. The respective imaging device is configured to produce a digital video stream, i.e. a coherent time-sequence of digital images. The respective image is a two-dimensional (2D) representation of the scene, or part thereof, as seen by the imaging device. The imaging device may comprise imaging optics, a digital image sensor responsive to electromagnetic radiation, and control electronics for acquiring signals from the digital image sensor and generating a digital image, which may be monochromatic or polychromatic. The respective imaging device may be responsive to electromagnetic radiation in any wavelength range, including but not limited to ultraviolet, visible or infrared radiation, or any part or combination thereof.

As used herein, "field of view" has its conventional meaning and denotes the extent of the scene that is observed by the respective imaging device at any given moment and may be defined as a solid angle through which the imaging device is sensitive to the electromagnetic radiation.

As used herein, "keypoint" has its conventional meaning in the field of computer vision and is also known as an interest point. A keypoint is a spatial location or point in an image that define what is interesting or what stand out in the image and may be defined to be invariant to image rotation, shrinkage, translation, distortion, etc. More generally, a keypoint may be denoted a "reference point" on an object to be detected in the image, with the reference point having a predefined placement on the object. Keypoints may be defined for a specific type of object, for example a human body, a part of the human body, or an inanimate object with a known structure or configuration. In the example of a human body, keypoints may identify one or more joints and/or extremities. Keypoints may be detected by use of any existing feature detection algorithm(s), for example image processing techniques that are operable to detect one or more of edges, corners, blobs, ridges, etc. in digital images. Non-limiting examples of feature detection algorithms comprise SIFT (Scale-Invariant Feature Transform), SURF (Speeded Up Robust Feature), FAST (Features from Accelerated Segment Test), SUSAN (Smallest Univalue Segment Assimilating Nucleus), Harris affine region detector, and ORB (Oriented FAST and Rotated BRIEF). Further information about conventional keypoint detectors is found in the article "Local invariant feature detectors: a survey", by Tuytelaars et al, published in Found. Trends. Comput. Graph. Vis. 3(3), 177-280 (2007). Further examples of feature detection algorithms are found in the articles "Simple Baselines for Human Pose Estimation and Tracking", by Xiao et al, published at ECCV 2018, and "Deep High-Resolution Representation Learning for Human Pose Estimation", by Sun et al, published at CVPR 2019. Correspondingly, objects may be detected in images by use of any existing object detection algorithm(s). Non-limiting examples include various machine learning-based approaches or deep learning-based approaches, such as Viola—Jones object detection framework, SIFT, HOG (Histogram of Oriented Gradients), Region Proposals (RCNN, Fast-RCNN, Faster-RCNN), SSD (Single Shot MultiBox Detector), You Only Look Once (YOLO, YOLO9000, YOLOv3), and RefineDet (Single-Shot Refinement Neural Network for Object Detection).

As used herein, "pose" refers to a collection of positions that define the posture of an object. The pose may define the posture of the object in an image. Such a pose is denoted 2D pose and comprises a collection of 2D positions in the image. The pose may define the posture of the object in a scene. Such a pose is denoted 3D pose and comprises a collection of 3D positions in the scene.

Embodiments are related to image processing for detection of features of individual objects in 2D images. Embodiments are based on the top-down approach, described in the Background section, which involves object detection followed by feature detection. The following description will be given for human objects but is equally applicable to animals as well as inanimate objects. Embodiments will be described in relation to 3D pose reconstruction, in which the 3D pose of an object in a scene is determined based on images taken at different angles relative to the scene, and thus the object.

FIG. 1A shows an example arrangement of a monitoring system 1, which may implement various embodiments. The system 1 is arranged to monitor a scene 5 in a room 100. In the illustrated example, three individuals 10 are in the room 100. The system 1 comprises a plurality of imaging devices 2, for example digital cameras, which are oriented with their respective field of view 20 towards the scene 5. For simplicity, the imaging devices are denoted "cameras" in the following. The scene 5 is associated with a fixed 3D coordinate system 30 ("scene coordinate system"). The cameras 2 may be fixed or moveable, and their relative positions and orientations are known for each image taken. The cameras 2 may be synchronized to capture a respective image at approximately the same time, or at least with a maximum time difference which depends on the expected maximum speed of movement of the objects 10. In one example, a maximum time difference of 0.1-0.5 seconds may provide sufficient accuracy for normal human motion.

The cameras 2 are connected for data communication with a reconstruction device 3. The data communication may be performed by wire or wirelessly, based on any standardized or proprietary protocol. The cameras 2 are configured to transfer image-related data to the reconstruction device 3, which is configured to process the image-related data to determine the 3D pose of at least one object in the scene 5. The 3D pose is given by locations of a plurality of features of the object in the scene coordinate system 30.

In the example of FIG. 1, the system 1 further comprises a monitoring device 4, which is configured to receive 3D pose data from the reconstruction device 3. The monitoring device 4 may be configured to store, analyze, process or present the 3D pose data. In one example, the monitoring device may perform so-called action or activity recognition based on time sequences of 3D poses generated by the reconstruction device 3.

The system 1 may be seen to implement an image processing method for determining 3D poses. The method may be partitioned in different ways between the camera 2 and the reconstruction device 3. In some embodiments, the respective camera 2 transfers its images, optionally pre-processed, to the reconstruction device 3, which is configured to process the images from the cameras 2 for object detection, feature detection, and 3D pose reconstruction. Examples of such embodiments will be described further below with reference to FIG. 3B. In some embodiments, the respective camera 2 is configured to process its images by object detection and feature detection to determine a 2D pose and to transfer 2D pose data to the reconstruction device 3, which is configured to perform 3D pose reconstruction based on the 2D poses from the cameras 2. Examples of such embodiments will be described further below with reference to FIG. 3A.

The above-mentioned object detection and feature detection in an image results in 2D pose data, which represents the 2D pose of one or more objects in the image. The 2D pose is given by locations of a plurality of predefined features of the object in a fixed coordinate system of the image ("image coordinate system").

Figure 1C:
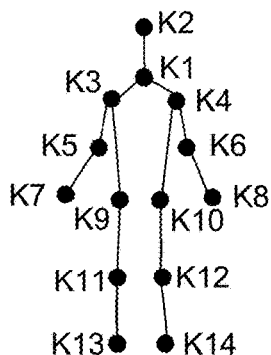
FIG. 1D illustrates an image captured by one of the cameras in the system.
Figure 1D:
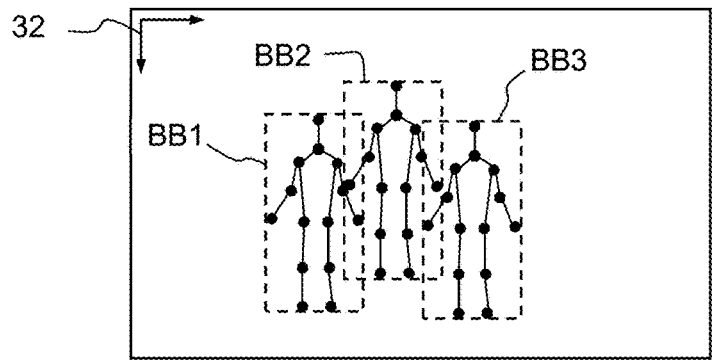

The predefined features may be or include the above-mentioned keypoints. An example of keypoints K1-K14 that may be detected for a human individual is shown in FIG. 1C. However, any number of keypoints may be detected depending on implementation. As understood from FIG. 1C, the keypoints have a predefined location of the object and their locations in an image define the 2D pose of the object.

FIG. 1B shows an example of 2D pose data that may be generated in the system 1 for images taken by the three cameras 2 in FIG. 1A. Although FIG. 1B shows a table, the 2D pose data may be given in any format. In the illustrated example, the 2D pose data represents each image by a respective view identifier (1-3 in FIG. 1B) and each object by a respective object identifier (1-3 in FIG. 1B) and comprises a keypoint position for each keypoint detected for the respective object (L1-L14 in FIG. 1B). If a keypoint is not detected, the location of this keypoint may be represented by a predefined value (for example, a null value).

Object detection is performed to detect the individual objects in the image. The object detection results in an analysis area for the respective object in the image. An example of an image is given in FIG. 1D, in which three analysis areas BB1, BB2, BB3 have been defined, one for each object. The analysis area may be defined as a bounding box, as shown, around the object. The feature detection is then operated on the respective analysis area BB1, BB2, BB3 to detect predefined features of the object, indicated as points in FIG. 1D. The locations of the features are determined in the image coordinate system 32.

One technical challenge in this context is to handle occlusions in which an object is partially hidden in an image, for example behind another object, and/or crowding in which objects are in close vicinity to each other in one or more views. For example, as understood from FIG. 1D, it may be challenging to define the analysis areas BB1-BB3 when the objects are standing close to each other.

Another challenge may be to perform the imaging processing in a processing efficient way to save computing resources and, possibly, to enable real-time processing. Such real-time processing may, for example, allow real-time tracking of objects and 3D poses based on video streams from the cameras, for example by the monitoring device 4 in FIG. 1A.

Figure 2A:
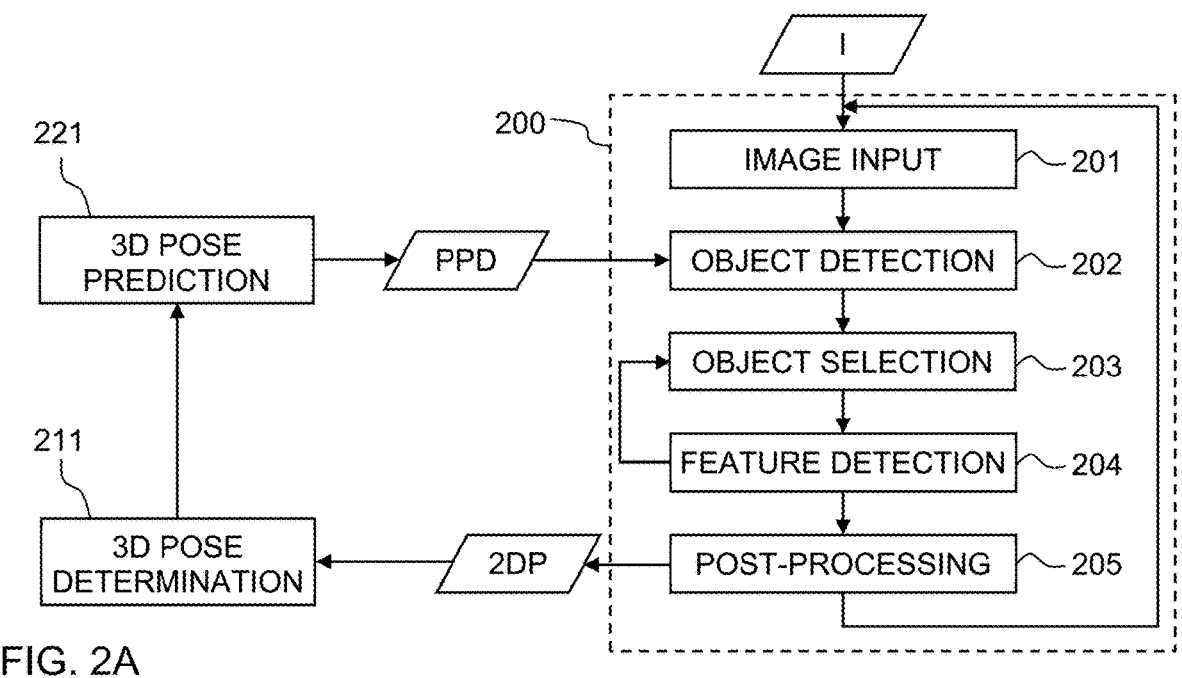
FIGS. 2A-2B are flow charts of image processing methods in accordance with embodiments.

FIG. 2A is a flow chart of processing that may be performed in the system 1. The processing comprises an image processing method 200, which receives images I and outputs 2D pose data ("2DP"). The images I are generated by one of the cameras 2. The method 200 comprises a sequence of steps that may be repeated for each incoming image. Step 201 comprises receiving or inputting the image. Step 202 comprises processing the image for detection of objects, also referred to as "object detection" herein. Each of the detected objects may be represented by an analysis area in the image (cf. BB1-BB3 in FIG. 1D). Step 203 comprises selecting one of the objects detected by step 202. Step 204 comprises processing the selected object for detection of features, also referred to as "feature detection" herein. Step 204 may operate any suitable feature detection algorithm on the analysis area for the selected object, for example any of the algorithms mentioned above. Steps 203-204 may be repeated for all objects in the image I. Step 203 may be omitted if the images are known to only include one object. Step 205 comprises post-processing the features detected by step 204 for the respective object, to generate 2D pose data, 2DP, that represents a detected 2D pose of each object.

The system 1 may comprise one instance of the method 200 for each camera 2. Each such instance of the method 200 may generate 2DP for a respective image I captured by one of the cameras 2. It may be noted that the cameras 2 generate time sequences of images, which are processed by the instances of the method 200 into corresponding time sequences of 2DP.

As shown in FIG. 2A, the processing in the system 1 also comprises a step 211 that performs 3D pose reconstruction, also known as "3D pose determination". Step 211 comprises receiving 2DP for all objects that are detected by the different instances of the method 200 in time-synchronized images generated by the cameras 2. Step 211 processes the 2DP to match 2D poses of the same object as detected by different cameras and to calculate, based on the thus-matched 2D poses, a 3D pose for each object in the scene coordinate system 30 (FIG. 1A). The matching or association of 2D poses from different cameras may be performed by any conventional technique. The skilled person understands that a 3D position of a keypoint may be computed based on 2D positions of the keypoint in images taken by two or more cameras 2, and by use of calibration data for the cameras 2. The calibration data includes one or more parameters that define the positions and orientations of the cameras 2 (or their image sensors) in relation to each other and/or the scene. Such calibration data may, for example, be determined by calibration, as is well known in the art. Step 211 may operate any known triangulation algorithm on time-synchronized 2D poses that are included in 2DP for two or more cameras 2. Non-limiting examples of triangulation algorithms include linear triangulation algorithms, optimal triangulation algorithms, and branch-and-bound triangulation algorithms.

The calculated 3D pose may be provided for storage, analysis, processing or presentation, for example by the monitoring device 4 or the reconstruction device 3. However, as shown in FIG. 2A, the calculated 3D pose may also be used by a step 221 that performs 3D pose prediction. Step 221 comprises receiving a time sequence of 3D poses of an object from step 211 and predicting the 3D pose of the object at one or more future time points. Predicting a 3D pose at future time points is equivalent to forecasting 3D motion. This is an active research field and there many available techniques for forecasting 3D motion, for example as described in "Forecasting Characteristic 3D Poses of Human Actions", by Diller et al, published in arXiv:2011.15079v2 [cs.CV] 7 Apr. 2021, and references cited therein. Further examples are found in "Anticipating many futures: Online human motion prediction and synthesis for human-robot collaboration", by BUtepage et al, published in arXiv: 1702.08212v1 [cs.RO] 27 Feb. 2017, and references cited therein. A further example is described below with reference to FIG. 9.

Step 221 may thus operate a 3D pose prediction algorithm on time sequences of 3D poses that are calculated by step 211 to predict one or more 3D poses of the respective object. Step 221 generates pose prediction data, PPD, which includes predicted poses of the respective object as a function of time. Depending on implementation, the PPD may be generated to include predicted 3D poses in the scene coordinate system 30 (denoted "3D-PPD") or predicted 2D poses in the image coordinate system 32 of the respective camera 2 (denoted "2D-PPD"). For example, step 221 may project predicted 3D poses into 2D poses by use of the above-mentioned calibration data for the respective camera 2. It should be noted that the predicted 2D poses will be specific to each camera 2. Thus, step 221 may result in 2D-PPD that includes predicted 2D poses for all of the cameras 2 or one specific 2D-PPD for each camera 2. In some embodiments, the 2D poses generated by projection of predicted 3D poses may be further processed to optimize the 2D-PPD for each camera. In one example, the projected 2D poses that are not within the field of view of a respective camera 2 may be excluded in the 2D-PPD for this camera. In another example, occlusion may be deduced within the field of view of the respective camera, and projected 2D poses that are found to be fully or heavily occluded may be excluded in the 2D-PPD for the respective camera.

As shown in FIG. 2A, the PPD is received by step 202, which uses the PPD when detecting the objects in the incoming images I. As will be understood from the following, the provision of the PPD has the potential of improving the object detection performed by step 202, in terms of speed and/or accuracy.

Figure 2B:
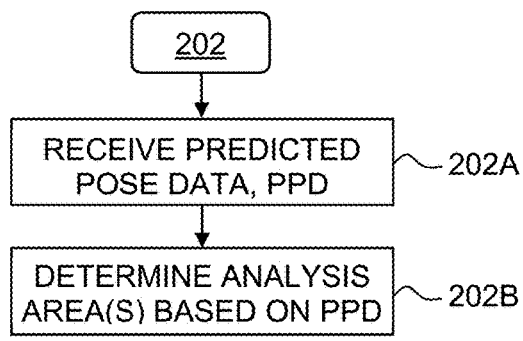

FIG. 2B shows steps 202A, 202B that may be performed by step 202 to capitalize on the provision of the PPD. Step 202A comprises receiving the PPD, and step 202B comprises determining an analysis area for each object based on the PPD. Step 202B may match the PPD to the incoming images, at least temporally, to determine an expected extent of the respective object in one or more of the incoming images and set the analysis area in relation to the expected extent. The analysis area defines a sub-region of the image and may be of any shape and may be defined to include or surround the expected extent of the object. In some embodiments, the analysis area is a bounding box similar to the boxes BB1-BB3 shown in FIG. 1D. In the following, the object detection performed by steps 202A-202B is referred to as "predicted object detection".

If step 221 generates the PPD to include predicted 2D poses (2D-PPD), the PPD is already spatially matched to the incoming images. In this context, "spatially matched" implies that the predicted poses in the PPD are given in the image coordinate system of the incoming images. On the other hand, if step 221 generates the PPD to include 3D poses (3D-PPD), step 202B comprises projecting the 3D poses into the image coordinate system of the incoming images by use of the above-mentioned calibration data, to thereby spatially match the predicted poses in the PPD to the incoming images.

Reverting to FIG. 2A, step 202 may also be arranged to perform conventional object detection, in which the incoming images are processed for detection of additional objects, for example by use of any of the object detection algorithms mentioned above. In the following, such conventional object detection is referred to as "full object detection". The full object detection does not restrict the image processing to analysis areas and is considerably more processing intensive and thus power consuming than the predicted object detection. The full object detection may be performed at startup, so that the method 200 generates 2DP for all objects in the scene. At startup, the full object detection is performed on images captured by at least two cameras, so that step 211 receives at least two 2D poses and is able to perform 3D pose determination. Thereby, the output of the full object determination is included in the PPD.

It is realized that the provision and use of the PPD will facilitate detection of features of individual objects in the incoming images, even if the objects are occluded and/or crowded in the images. It is also realized that the power consumption of the image processing method 200 is reduced considerably by the use of the predicted object detection.

In the example of FIG. 2A, it may also be noted that the PPD is generated based on 3D poses of the objects in the scene. Thus, the PPD represents 3D poses. This means that the predicted extent of the objects in the images is determined by taking into account the movement of the objects in 3D space. By using a time sequence of 3D poses for the prediction, it is possible to extract movement information that is not derivable from individual images and provide a high-quality prediction of the extent of the objects in the images. The use of 3D poses also makes it possible to apply realistic constraints for the movement of an object in three-dimensional space when generating the PPD. In the example of human objects, the prediction by step 221 may apply constraints that represent 3D movements that are impossible or unrealistic for human objects.

FIG. 3A is a block diagram of an example partitioned implementation of the processing in FIG. 2A in a system 1. The cameras 2 are configured to perform the image processing method 200 and transfer 2D pose data, 2DP, to the reconstruction device 3, which is configured to perform 3D pose prediction in accordance with step 211. As shown, the reconstruction device 3 outputs one or more 3D poses (3DP), for example for receipt by the monitoring device 4 in FIG. 1A. The reconstruction device 3 is also configured to perform 3D pose prediction in accordance with step 221 and transfer the resulting PPD to the cameras 2. The partitioning in FIG. 3A provides scalability to the system 1, in that an increasing number of cameras 2 results in a moderate increase in processing load of the reconstruction device 3. Further, the power consumption of the cameras 2 may be drastically reduced by the use of the predicted object detection compared to the use of full object detection only.

Thereby, the partitioned implementation has the potential of increasing the service interval of battery-powered cameras 2.

FIG. 3B is a block diagram of a centralized implementation of the processing in FIG. 2A. The cameras 2 are configured to transfer the images I to the reconstruction device 3, which is a "processing device" configured to perform the image processing method 200, the 3D pose prediction in accordance with step 211, and the 3D pose prediction in accordance with step 221. In the centralized system 1, the use of the predicted object detection results in the technical advantage of increasing processing speed and/or accuracy compared to the use of conventional object detection. The increase in processing speed may, for example, be used to increase the frame rate of the cameras 2.

In some implementations, whether partitioned or centralized, the reconstruction device 3 may be included or embodied in one of the cameras 2.

FIG. 4 is a block diagram of a camera 2 and a reconstruction device 3 in a partitioned system. The camera 2 may be seen as a "processing device" with an image sensor 51. The camera 2 is configured to perform the image processing method 200 in FIG. 2A, and the reconstruction device 3 is configured to perform steps 211 and 221 in FIG. 2A. In the illustrated example, the camera 2 comprises an object detection module 52, which is configured to perform steps 201-202, and feature detection module 53, which is configured to perform steps 203-204, and a 2D pose determination module 54, which is configured to perform step 205. For the avoidance of doubt, module 53 may be configured to selectively perform predicted object detection or full object detection, or both. Object detection in accordance with steps 201-202 is also abbreviated OD in the following. The communication module 55 is configured to establish data communication with a corresponding communication module 65 in the reconstruction device 3 on a wired or wireless communication path. As shown, module 52 receives an incoming image I from the image sensor 51 and PPD from the communication module 55 and outputs a set of analysis areas, [BB], for the object(s) in the image I. The module 53 receives and processes the image I based on [BB] and outputs location data, [L], for a plurality of keypoints in the respective analysis area. The location data defines the locations of the detected keypoints in the image coordinate system (32 in FIG. 1D). The module 53 receives [L] and outputs the 2DP for the objects in the image I. The communication module 55 is then operated to transfer the 2DP to the reconstruction device 3. Depending on implementation, the camera may transfer 2DP for a single image or for a plurality of consecutive images.

In the example of FIG. 4, the reconstruction device 3 comprises a triangulation module 61 which is configured to perform step 211, a storage module 62, a prediction module 63 which is configured to perform step 221, and a communication module 65. As indicated by dashed lines, the device 3 may also comprise a latency estimation module 64. The communication module 65 is configured to communicate with the communication module 55. The module 65 receives 2DP from the camera 2. As understood from the foregoing, module 65 also receives 2DP from one or more other cameras (not shown) and/or from a camera (not shown) in the reconstruction device 3. Module 61 receives all the incoming 2DP and outputs 3DP for storage in module 62. As understood from the foregoing, module 61 is configured to generate a 3D pose based on 2D poses from images captured by two or more cameras in time synchronization. Thus, 3DP may include one or more 3D poses, depending on the number of 2D poses that are transmitted in 2DP from each camera. The storage module 62 is configured to hold a history database, which contains the most recent 3D poses that have been determined by the module 61. The history database is updated for each incoming 3DP from module 61. The storage module 62 may comprise management function that operates on the history database to remove the oldest 3D poses as new 3D poses are added (First-In-First-Out, FIFO). The prediction module 63 is configured to receive a predefined number of the most recent 3D poses, arranged in time sequence, to the prediction module 63. This time sequence of 3D poses is designated as [3DP] in FIG. 4. The communication module 65 is then operated to transfer the PPD generated by module 63 to the camera 2 and to other cameras in the system. As noted above, depending on implementation, the same or different PPD may be transferred to the different cameras in the system.

Although not shown in FIG. 4, the calculated 3DP may be output by the reconstruction module 3, for example via the communication module 65, for use in any type of post-processing or analysis. Alternatively, such post-processing or analysis may be performed by the reconstruction module 3. Thus, generally, the system 1 may be configured to store, output or process 3DP as calculated by the reconstruction device 3.

Figure 7A:
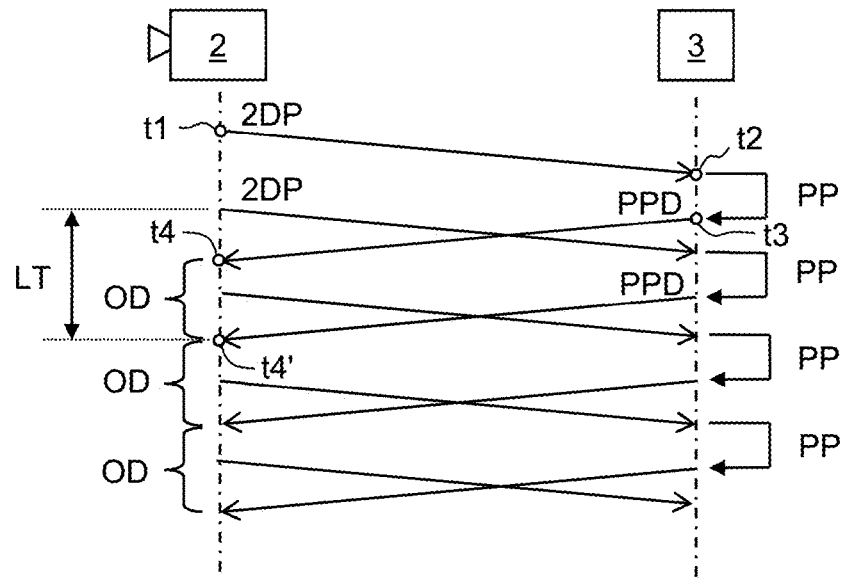
FIG. 7A is a sequence diagram of processes in an imaging device and a central node in an example system.
Figure 7B:
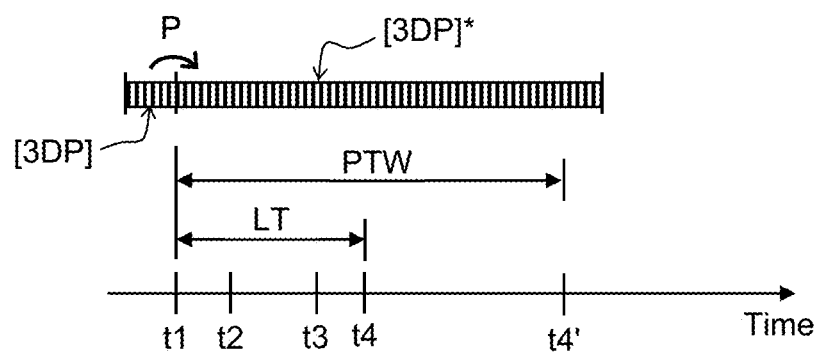
FIG. 7B is a timing diagram of processes in relation to the sequence diagram in FIG. 7A.

The operation of the system components in FIG. 4 is further illustrated in the sequence diagram of FIG. 7A. The system components perform a time sequence of round-trips, each starting with transmission of 2DP and ending with receipt of PPD. In such a round-trip, the camera 2 transmits 2DP at t1. The reconstruction device receives 2DP at t2, performs pose processing PP by modules 61-63 and transmits the resulting PPD at t3. The camera 2 receives PPD at t4. The time period t1-t4 is denoted latency period and designated LT. After receiving the PPD, the camera 2 uses the PPD for object detection OD by module 52 ("predicted OD"). In the illustrated example, the camera 2 uses the PPD for object detection until the next PPD is received, at time t4'. This is further illustrated in the chart of FIG. 7B, where [3DP] is the time sequence of 3D poses that are available for the 3D pose prediction by module 63 during the pose processing PP, and [3DP]* is a time sequence of predicted 3D poses generated by the module 63 operating a pose prediction algorithm on [3DP], as indicated by arrow P in FIG. 7B. The PPD is then generated by module 63 to represent at least part of [3DP]*. FIG. 7B indicates a prediction time window, PTW, which defines the time span of 3D poses that needs to be predicted by the module 63 when generating the PPD. As understood from FIG. 7A, the PTW should include the time period t4-t4', if predicted OD is to be performed in this time period, to ensure seamless and continuous operation of predicted OD. The skilled person realizes that the time point t4', and thus the extent of the PTW, is affected by the latency period LT, which may vary during operation of the system, for example as a result of fluctuations in the quality of the communication path or variations in the processing load of the camera 2 and/or the reconstruction device 3. In some embodiments, PTW may be fixed and set in view of a predefined maximum latency period for the system. In other embodiments, LT may be measured or estimated in the system and PTW may be dynamically set based on the measured/estimated LT. The latency period may be estimated in any conventional way, for example based on measurements of previous roundtrip times. Alternatively or additionally, the latency period may be estimated by a neural network which has been trained to estimate or predict the latency period based on a plurality of communication-related parameters, such as previous roundtrip times, signal strength, node telemetry, etc. In the example of FIG. 4, module 64 is configured to provide a current value of LT to module 63, which adjusts the PTW accordingly.

As understood from FIG. 7B, [3DP]* for the latency period LT is redundant since it is not used in the subsequent predicted OD. Thus, to reduce data traffic, an initial part of [3DP]* may be excluded from the PPD. In some embodiments, the extent of the initial part may be fixed and correspond a predefined minimum latency period for the system. In other embodiments, the extent of the initial part may be dynamically set based on the measured/estimated LT.

The sequence diagram in FIG. 7A is applicable both to an implementation in which the camera 2 continuously, at consecutive time steps, transmits an 2DP that includes 2D poses for one or more objects at the respective time step, and an implementation in which the camera 2 accumulates a time sequence of 2D poses for the object(s) and include the accumulated time sequence in the 2DP that is transmitted to the reconstruction device 3. The latter implementation may serve to reduce data traffic between the camera 2 and the reconstruction device 3.

In FIG. 4, the triangulation module 61 and the prediction module 63 are physically separated from the camera 2. In a variant, the modules 61, 63 are also physically separated from each other.

Figure 5A:
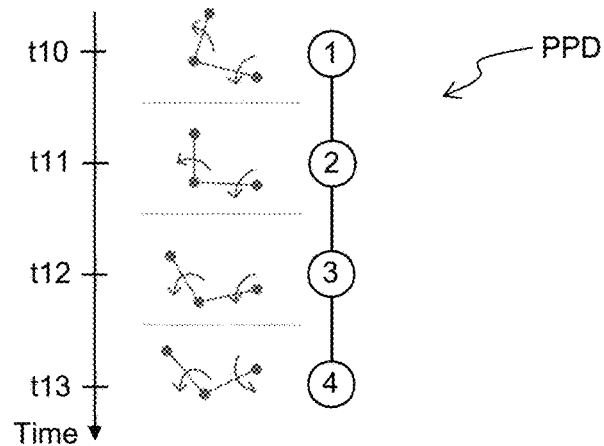
FIGS. 5A-5B are exemplifying illustrations of pose prediction data.

FIG. 5A is a graphical illustration of PPD received and used by step 202 in the method 200 (FIG. 2A). The PPD comprises a parametric representation of the predicted pose of an object as a function of time. In this context "as a function of time" merely implies that the PPD defines a timeline of predicted poses of the object, where the timeline may or may not be branched (below). In the example of FIG. 5A, the PPD defines a predicted pose (2D or 3D) at a starting time t10 and at subsequent time points t11, t12, t13. There may be any time distance between the time points t10, t11, t12, t13. The predicted poses may be seen as consecutive states 1-4 of the timeline. The parametric representation may be given in any format to represent a movement pattern of object features over time. In one example, the parametric representation comprises start locations (coordinates) of object features (for example, keypoints) at a start time, and movement parameters of the object features for one or more time periods defined in relation to the start time. Such movement parameters may define transformations in two or three dimensions, for example as indicated by arrows in FIG. 5A. Examples of transformations include translation and rotation. The transformations may be represented in either a global reference frame or some local, object or part-specific reference frame. In another example, which may be particularly suitable for 2D-PPD, the parametric representation comprises locations of object features at a starting time and at subsequent time points.

Figure 5B:
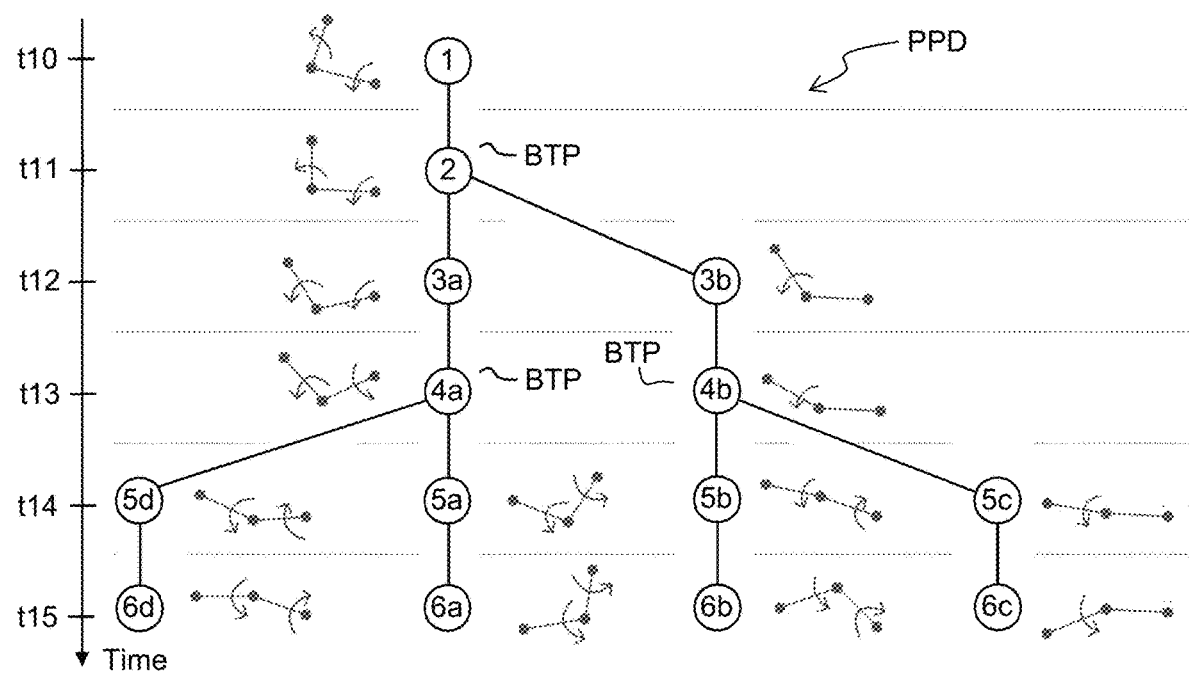

FIG. 5B is a graphical illustration of PPD that defines a branched timeline of predicted poses. The different branches define possible and alternative progressions of the predicted movement of the respective object. Specifically, the PPD may define a branching time point (BTP) which separates a progressing time sequence of predicted poses into two or more alternative sequences of poses. In FIG. 5B, the PPD defines a BTP at t11, at which the timeline is branched into either state 3a or state 3b at t12. Further, one BTP at t13 branches the timeline from state 4a into either state 5a or state 5d, and one BTP at t13 branches the timeline from state 4b into either state 5b or state 5c. The provision of a branched timeline presumes that the pose prediction algorithm used in step 212 is capable of predicting alternative progressions of the movement of the object. In addition, the pose prediction algorithm may be capable of predicting a probability value of transitioning into each branch. The use of a branched timeline has the potential of improving the object detection by step 202, by allowing step 202 to determine a predicted pose based on recently detected 2D poses, as will be described below with reference to FIG. 6B.

Figure 6A:
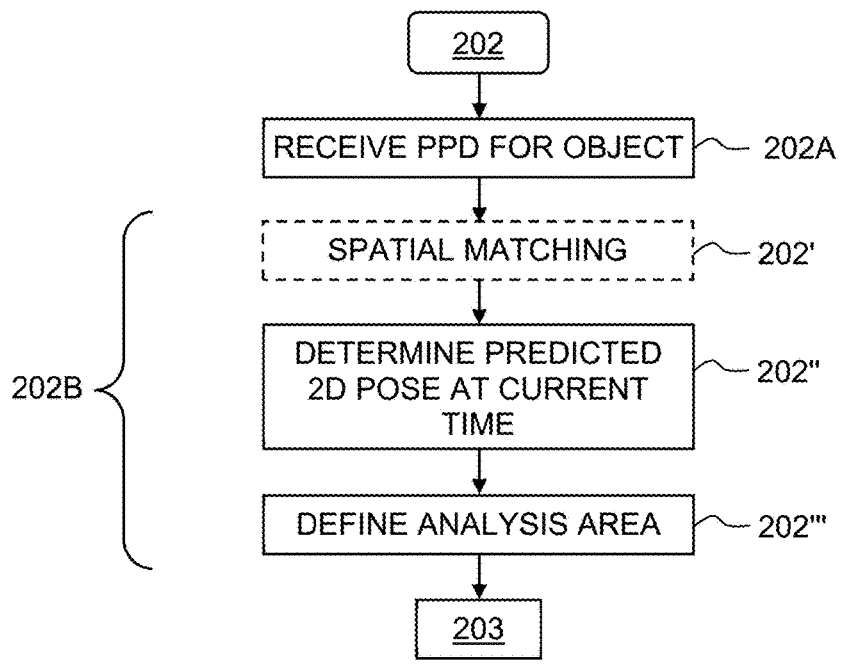
FIGS. 6A-6C are flow charts of object detection procedures in accordance with examples.

FIG. 6A is a flow chart of an example procedure included in step 202 of the image processing method 200. The procedure comprises the same steps 202A, 202B as the procedure in FIG. 2B. Step 202B comprises an optional step 202', which may be performed if the PPD includes 3D poses (3D-PPD). Specifically, in step 202', the PPD is processed to spatially match one or more 3D poses to the image coordinate system. For example, step 202' may use the above-mentioned calibration data to project 3D poses into 2D poses. In a variant, step 202' may be performed as part of the step 202" (cf. FIG. 6B below). If the PPD includes 2D poses (2D-PPD), step 202' is omitted. In step 202", a predicted 2D pose of the object is determined based on the PPD by temporal matching. In this context, "temporally matching" implies that the predicted 2D pose is determined, at least approximately, for the time point when the image was captured. For simplicity, this time point is referred to as the "current time". In step 202''', the analysis area is defined with respect to the predicted 2D pose from step 202", for example such that the analysis area surrounds the predicted 2D pose, optionally with a margin to account for uncertainty in the pose prediction.

Figure 6B:
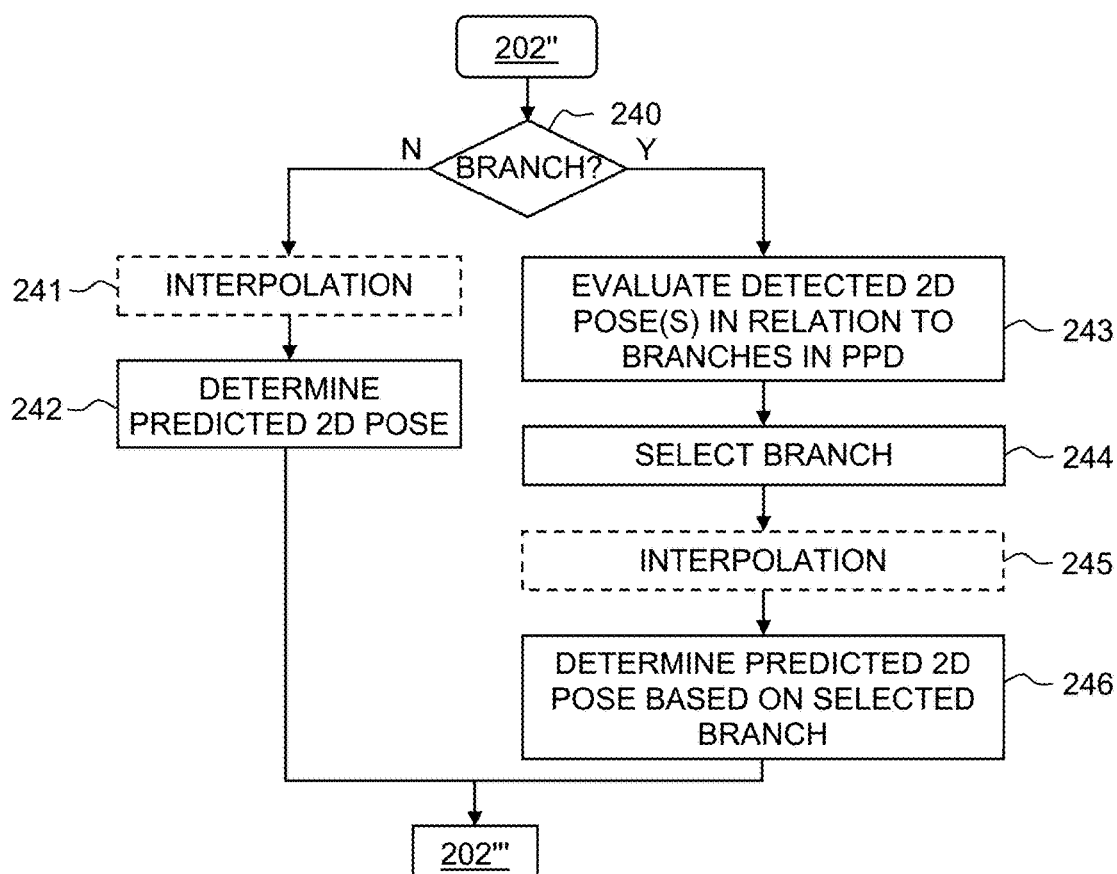

FIG. 6B is a flow chart of an example procedure that may be included in step 202" in FIG. 6A. The procedure in FIG. 6B is applicable to both branched and non-branched PPD. In step 240, the PPD is evaluated for detection of a BTP in relation to the current time. If no BTP is detected, the procedure proceeds to step 242, in which a predicted 2D pose is determined for the current time. In one example, the predicted 2D pose is extracted among a time sequence of 2D poses defined by 2D-PPD, or 3D-PPD after processing by step 202' (FIG. 6A). In another example, in which 3D-PPD is used and step 202' is omitted, the predicted 2D pose is extracted by calculating a predicted 3D pose at the current time based on the parametric representation in the 3D-PPD, and by projecting the thus-predicted 3D pose onto the image by analogy with step 202'. As indicated in FIG. 6B, step 242 may be preceded by an optional interpolation step 241. Step 241 comprises performing a temporal interpolation among predicted poses in the PPD. Step 241 may be applied if there is a mismatch between the current time and time points of predicted poses in the PPD. For example, if the current time point falls between time points of two predicted 2D poses in the PPD, an interpolated 2D pose for the current time may be generated based on these two predicted 2D poses, by interpolation between corresponding feature locations in these two predicted 2D poses.

If a BTP is detected by step 240, the procedure proceeds to step 243, in which one or more previously detected 2D poses (by step 205 in previous repetitions of the method 200) are evaluated in relation to the predicted poses in the branches that originate at the BTP. The previously detected 2D poses are associated with time points at or near the BTP. In one example, step 243 comprises temporally matching each previously detected 2D pose to a predicted pose in the branches and calculating a difference between the temporally matched poses. It is realized that this evaluation needs to be performed sometime after the BTP, so that there is at least one detected 2D pose to be used in the evaluation. In another example, step 243 comprises operating a pose prediction algorithm on the previously detected 2D poses to generate one or more predicted 2D poses after the BTP and calculating a difference between the predicted 2D pose(s) and temporally matched poses in the different branches. In a non-limiting example, the difference between poses may be calculated as an aggregation of differences in location of corresponding keypoints between poses. In step 244, one of the branches is selected based on the evaluation in step 243. This branch is then used in subsequent repetitions of the method 200 (cf. FIG. 2), although it is possible to allow steps 243-244 to switch between branches within a given time period after a BTP. Step 244 is followed by steps 245 and 246, which correspond to steps 241 and 242, with the only difference that steps 245 and 246 operates on the branch that was selected by step 244.

Figure 6C:
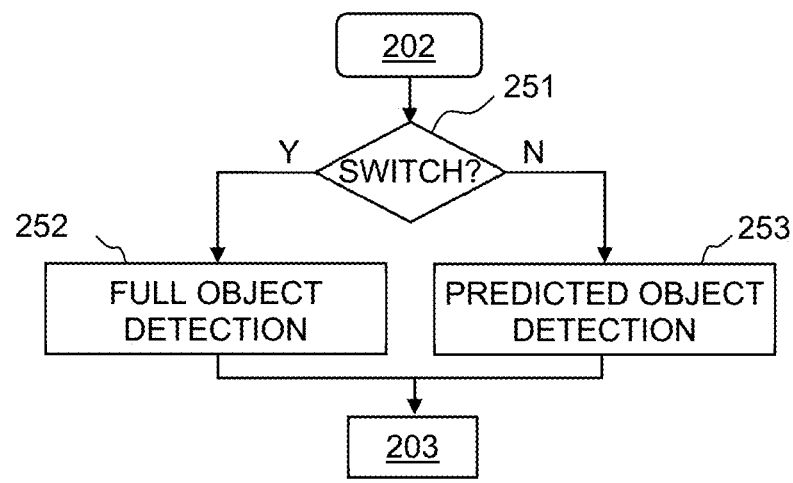

In some embodiments, full object detection is performed intermittently by step 202. Such intermittent activation of full object detection may be used to ensure that new objects entering the scene are properly detected and processed for feature detection, and that predicted poses of the new objects are included in the PPD for use in predicted object detection at a later time. The intermittent activation of full object detection may also be used to allow the image processing method 200 to recover a previously detected object that the method 200, for some reason, is unable to detect for a period of time. An example implementation is shown in FIG. 6C, in which step 202 performs the predicted object detection (step 253) by default. In step 251, a switching condition is evaluated to determine if full object detection (step 252) should be performed for a limited time period. The full object detection 252 may be performed instead of or in parallel with the predicted object detection 253. In the centralized system in FIG. 3B, the reconstruction device 3 may freely switch to full object detection since it has access to images captured by cameras 2 in the system. In the partitioned system in FIG. 3A, the cameras 2 may be operated jointly to perform the full object detection to enable 2D poses, which are detected by the full object detection, to be included in the PPD by the reconstruction device 3. To limit the power consumption of the system (centralized or partitioned), the full object detection may be performed on images captured by a subset of the available cameras in the system. The subset may or may not vary over time and may be selected based on any suitable criterion, including but not limited to round-robin, random, statistical importance of the camera, estimation of crowdedness in the images from the camera, lost 3D poses, etc. In some embodiments, the subset is chosen so that the respective object is likely to be included in at least one image at each time instant. The camera selection may be controlled by a trigger signal from the reconstruction device 3. In the partitioned system, step 251 may switch into, and possibly out of, the full object detection upon receipt of the trigger signal. Alternatively, step 251 may switch to full object detection based on a timing schedule stored in the cameras 2.

For the avoidance of doubt, all embodiments described with reference to FIGS. 5-6 are applicable to both the partitioned system in FIG. 3A and the centralized system in FIG. 3B.

The present Applicant has found the performance of step 205 of the method in FIG. 2A may be improved by use of the predicted 2D poses that are included in the 2D-PPD or determined from the 3D-PPD. Specifically, when determining detected 2D poses in step 205, the predicted 2D poses may be used to perform a validation of the features that are detected in step 204. In the validation, locations of features that are detected within an analysis area of an image may be compared to the locations of corresponding features in a predicted 2D pose that has been determined for the image. In this validation, if one or more detected feature locations are found to deviate significantly from the predicted feature locations, an error signal may be generated. The error signal may be used by the step 204 to modify the feature detection algorithm and/or by step 221 to modify the 3D pose prediction algorithm and/or by step 202 to modify the processing of the PPD, for example the selection of branch.

In some embodiments, the feature detection step 204 outputs a set of candidate locations and associated confidence values for the respective feature (keypoint). The candidate locations are different possible locations of the respective feature within the analysis area, and the confidence value designates the probability that the respective feature is located at the candidate location. For example, some feature detection algorithms generate so-called confidence maps, which are probability density functions that represent the probability of a feature being located at different locations in the analysis area. Examples of such feature detection algorithms include OpenPose and HRNet. Conventionally, the strongest peak in each confidence map is selected as the location of the respective feature, optionally after filtering of the confidence maps for removal of noise.

Figure 8A:
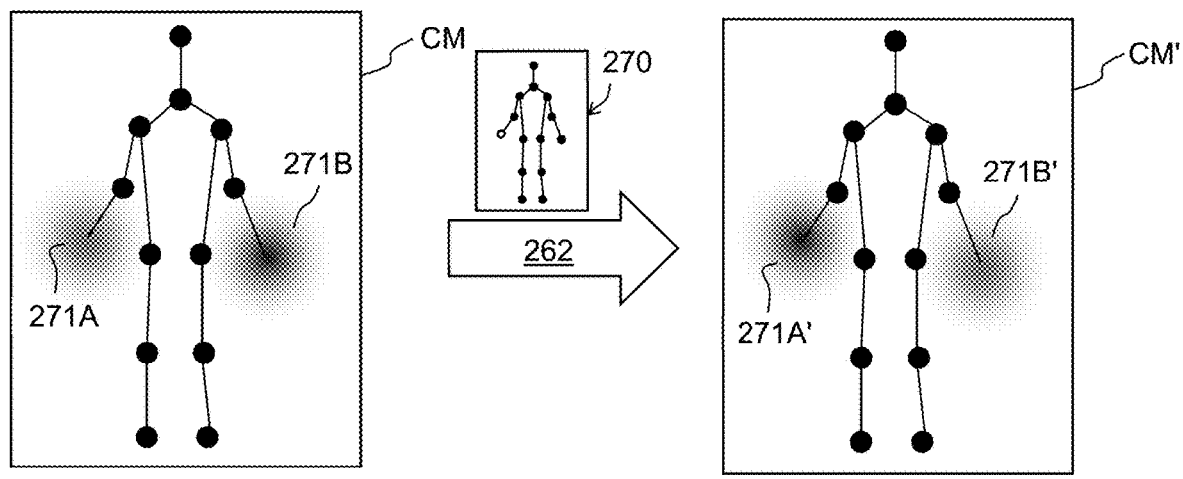
FIG. 8A is a graphical illustration of the effect of a filtering procedure.

The left-hand side of FIG. 8A shows an example of a confidence map CM for a keypoint corresponding to the right wrist of a human subject, with larger confidence values being represented by darker colors. The confidence map CM comprises a first region 271A of elevated confidence values centered on the right wrist and a second region 271B of elevated confidence values centered on the left wrist. In this example, the maximum confidence value is larger in region 271B than in region 271A. Thus, the feature detection algorithm in step 204 has confused the left and the right wrists, which means that step 205 will determine an incorrect 2D pose in which the right wrist is located in the position of the left wrist.

FIG. 8A also shows a predicted 2D pose 270 which has been determined for a time point corresponding to the confidence map CM. The predicted 2D pose 270 is used in a filtering procedure 262 to generate a corrected confidence map CM'. In the predicted 2D pose 270, the right wrist (open circle) is located on the right side of the object. The filtering procedure 262 operates a filter function, which is given by the predicted 2D pose 270, on CM to generate CM'. In CM', the confidence values are larger in region 271A' than in region 271B', and step 205 will correctly determine the location of the right wrist.

Figure 8B:
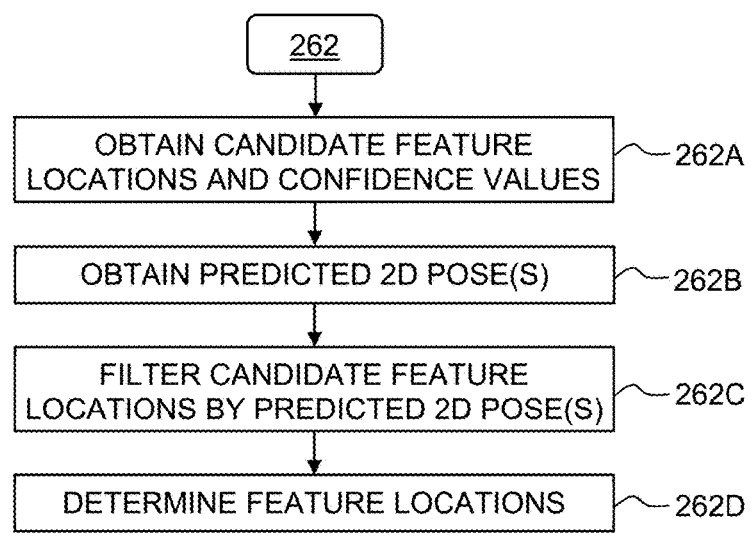
FIG. 8B is a flow chart of the filtering procedure in accordance with an example.

FIG. 8B is a flow chart of an example filtering procedure 262 that may be part of the post-processing step 205. Step 262A comprises obtaining a set of candidate locations of a predefined feature within an analysis area and confidence values for the candidate locations. The candidate locations and candidate values have been determined by the feature detection step 204 and is, for example, represented as a confidence map CM. Step 262B comprises obtaining one or more predicted 2D poses, which are directly or indirectly given by the PPD. Step 262C selectively modifies the set of confidence values for a predefined feature based on the location of a corresponding predefined feature in the predicted 2D pose, and based on a confidence or probability value of the predicted 2D pose, if available. Step 262D comprises determining the location of the respective predefined feature based on the modified confidence values.

Step 262C may be implemented to determine a filter function based on the predicted 2D poses from step 262B and operating the filter function on the confidence values. The filter function may be configured to increase candidate values near the location of the predefined feature in the predicted 2D pose in relation to other candidate values. The filter function may be defined in many different ways and may be algebraic or rule based. In one example, the filter function applies a respective weight to the candidate values, for example by multiplication, where the weight decreases with the distance between the candidate value and the location of the predefined feature in the predicted 2D pose. In a variant, the filter function is determined based on one or more predicted 3D poses, obtained by step 262B.

It may be noted that plural confidence maps may be obtained in step 262A, that these confidence maps may be selectively modified in step 262C based on the predicted pose(s) obtained in step 262B, and that the feature location may be determined based on the thus-modified confidence maps in step 262D. For example, confidence maps for different predefined features may be processed by steps 262C and 262D to determine the location of one predefined feature. For example, in FIG. 8A, a confidence map for the left wrist and a confidence map for the right wrist may be filtered and analyzed for determining the location of the right wrist.

The embodiments described with reference to FIGS. 8A-8B are applicable to both the partitioned system in FIG. 3A and the centralized system in FIG. 3B.

Figure 8C:
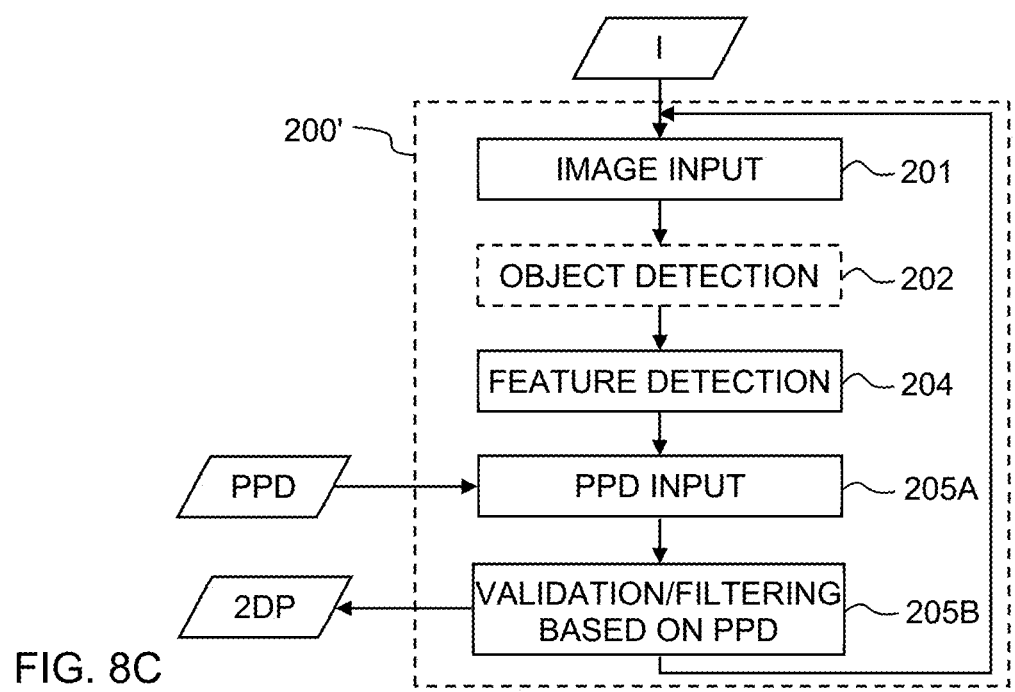
FIG. 8C is a flow chart of an image processing method in accordance with an embodiment.

In fact, the above-described validation and/or filtering procedure based on PPD may be used independently of object detection, to improve pose detection in an image. FIG. 8C is a flow chart of an example image processing method 200' in accordance with an embodiment. The method 200' may be performed by any device in the system of FIG. 1A, for example the camera 2 or the reconstruction device 3, if present. Step 201 comprises receiving or inputting an image I. As indicated by dashed lines, the method 200' may or may not comprise an object detection step 202. If present, step 202 may perform any type of object detection. Step 204 comprises processing the image I, optionally within an analysis area determined by step 202, for detection of features. Step 204 may be similar to step 204 in method 200. Step 205A comprises receiving or inputting PPD, which may be generated as described above for method 200 or in any other way. Step 205B comprises performing an evaluation based on the PPD received in step 205A, to generate and output a detected 2D pose (2DP). Step 205B may perform the above-described validation and/or the filtering procedure 262 (FIG. 8B).

Figure 9:
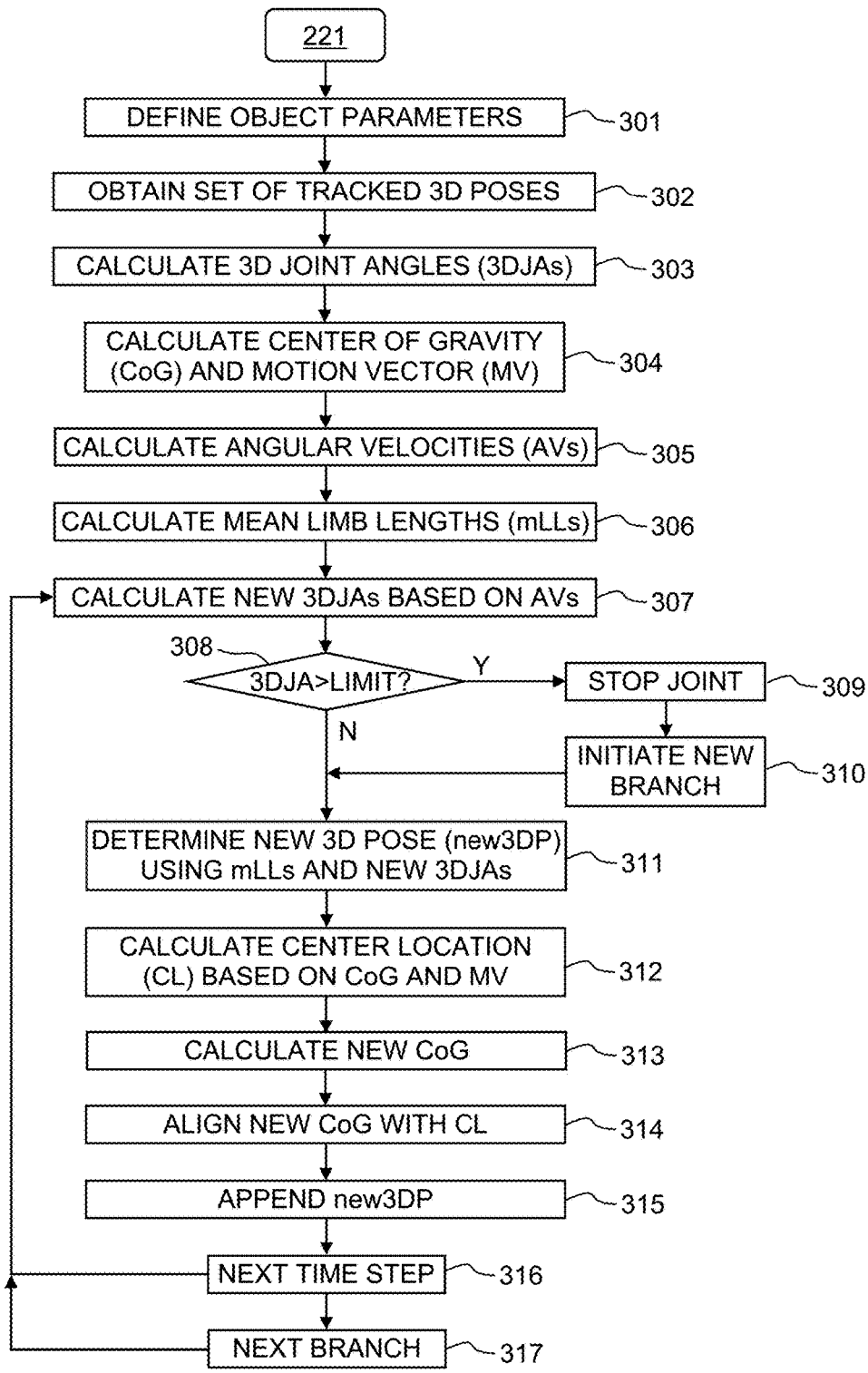
FIG. 9 is a flow chart of an example 3D pose prediction procedure.

FIG. 9 is a non-limiting example of an algorithm that may be implemented by step 221 to predict 3D poses of an object based on a time sequence of detected 3D poses. In the illustrated example, a branched timeline ("prediction tree") of predicted 3D poses is constructed. The algorithm in FIG. 9 may be suitable for implementation in resource constrained systems. The algorithm is exemplified for a human object but is also applicable to animals or inanimate objects. Step 301 comprises defining a skeleton for a tracked 3D object (T3DO) by specifying: a root joint (RJ), one or more pairs of joints, each making up a unique limb/edge in a tree structure, zero or more sets of symmetrical limbs (SL), a weight distribution (WD) that defines how much of the body weight that is centered around a specific joint, an angular uncertainty range (AUR) that defines how much the angular velocity (AV) for a joint may change at a random point in time, angular limits (AL) that define the range of possible angles for a joint, and optional overflow joints (OJ) for each joint. The OJs are joints over which the remainder of the angles that are outside the AL of a joint will be distributed, for example evenly or by specified weights. Step 302 comprises obtaining a time sequence of detected 3D poses of a T3DO. This time sequence may be generated by tracking detected 3D poses of an object over time. Step 303 comprises starting at the RJ and traversing all limbs to calculate the current 3D angles of each joint (3DJA) as the relation between the current limb and the ancestor (previous) limb. For the RJ, the vertical axis of the scene coordinate system (SCS) may be considered the ancestor limb. Step 304 comprises calculating the motion vector (MV) of the center of gravity (CoG) in the SCS, for example by first calculating the CoG as the mean position of all joints weighted by each joint's WD and then taking an exponential moving average of the difference of the CoG positions. Step 305 comprises calculating the AV for each joint in the pose, for example using an exponential moving average of the difference in joint angles between temporally adjacent poses. Step 306 comprises calculating the mean limb length (mLL) for each limb by averaging the lengths in all seen poses for the T3DO, taking symmetry into account by treating SL as the same limb. Then, steps 307-316 are performed repeatedly in discrete time steps. Step 307 comprises calculating new 3D joint angles from the previous angles plus the AV for the respective joint. If it is detected, by step 308, that a new 3DJA exceeds its AL, the timeline for the T3DO is branched by steps 309-310. In the original branch, the affected joint(s) may stop moving, and in the new branch the angle values, which could not be applied to the affected joint(s) as a result of the AL, may be distributed on the OJs of the affected joint(s). Thus, the AVs that exceed the AL are set to zero in the original branch and are unchanged in the new branch. The remainder outside the AL may be distributed to the OJs in a recursive fashion, for example so that AL is always respected, and remainders are distributed to the corresponding OJ when given.

To further explain steps 308-310 in a simplified example, consider a human body with a straight arm moving upwards so that only the shoulder joint has non-zero AV. When the angle of the shoulder joint hits its AL, the AV no longer affects the shoulder joint angle but instead overflows to the OJ of the shoulder joint, for example the elbow joint, making the arm bend. The timeline is then split into an original branch in which the arm is still with the shoulder angle at the AL, and a new branch in which the arm keeps on bending at the elbow joint.

It may be noted that steps 308-310 may consider several T3DOs in the calculations, for example to account for collisions or identify collaborative actions such as a handshake, a chase, etc.

In some embodiments, a new branch may also be created at random. For example, the AV for a randomly chosen joint may be multiplied by a random value in the joint's AUR.

Step 311 comprises determining a new 3D pose (new3DP) using the MLLs and the new3DJAs. Step 312 comprises calculating a center location (CL) for CoG alignment by extrapolation from the previous CoG, for example by adding MV to the previous CoG. Step 313 comprises calculating CoG for the new3DP, in correspondence with step 304. Step 314 comprises aligning the new3DP with CL by using the new CoG as anchor. Step 315 appends the new3DP to the timeline, and step 316 proceeds to the next time step and returns to step 307. When steps 307-316 have been repeated until an end time (cf. PTW in FIG. 7B), step 317 selects a next time step of one of the branches and returns to step 307, which proceeds to predict 3D poses for the branch. When steps 307-316 have been repeated for all branches until the end time, the method 221 may performed for another T3DO until predictions are generated for all T3DOs.

Figure 10:
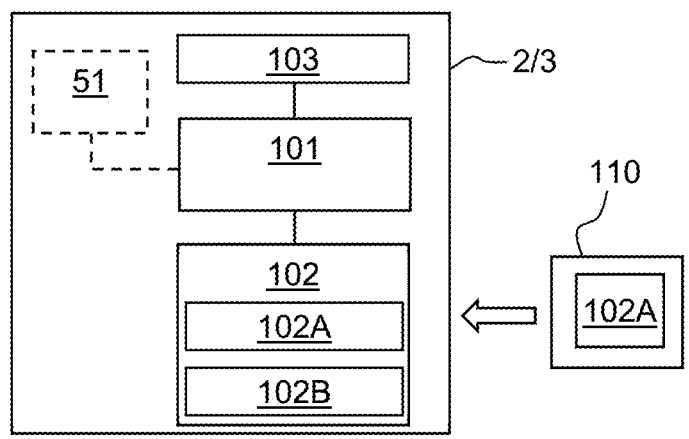
FIG. 10 is a block diagram of a machine that may implement methods disclosed herein.

The structures and methods disclosed herein may be implemented by hardware or a combination of software and hardware. In some embodiments, such hardware comprises one or more software-controlled computer resources. FIG. 10 schematically depicts such a computer resource, which may represent the camera 2 or the reconstruction device 3. The computer resource comprises a processing system 101, computer memory 102, and a communication interface 103 for input and/or output of data. Depending on implementation, the computer resource may also include an image sensor 51, as indicated by dashed lines. The communication interface 103 may be configured for wired and/or wireless communication. The processing system 101 may, for example, include one or more of a CPU ("Central Processing Unit"), a DSP ("Digital Signal Processor"), a microprocessor, a microcontroller, an ASIC ("Application-Specific Integrated Circuit"), a combination of discrete analog and/or digital components, or some other programmable logical device, such as an FPGA ("Field Programmable Gate Array"). A control program 102A comprising computer instructions is stored in the memory 102 and executed by the processing system 101 to perform any of the methods, procedures, operations, functions or steps described in the foregoing. As indicated in FIG. 10, the memory 102 may also store control data 102B for use by the processing system 102. The control program 102A may be supplied to the computing resource on a computer-readable medium 110, which may be a tangible (non-transitory) product (for example, magnetic medium, optical disk, read-only memory, flash memory, etc.) or a propagating signal.

Although the objects are represented as human individuals in the foregoing examples, the disclosed technique is applicable to any type of object, be it living or inanimate.

The techniques disclosed and exemplified herein have a variety of applications such as 3D vision inspection, product assembly, goods inspection, human-computer interaction, video surveillance, sports broadcasting, industry robot control, navigation, etc. The present Applicant also contemplates to arrange a monitoring system that implements the disclosed technique to track individuals in an exercise situation, for example in a gym. For example, the monitoring system may track how the individuals move around the gym, identify activity and count repetitions by use of 3D poses of the individuals, for example representing joints of the individuals, and store corresponding exercise data for the respective individual in a database for access by the respective individual or another party.

In the following, clauses are recited to summarize some aspects and embodiments of the invention as disclosed in the foregoing.

Clause 1. A processing device configured to: obtain a sequence of images of a scene captured by an image sensor (51); determine an analysis area ([BB]) for an object in a respective image in the sequence of images; and process the respective image within the analysis area ([BB]) for detection of predefined features of the object, wherein the processing device is further configured to receive pose prediction data (PPD) which represents predicted poses of the object as a function of time, and wherein the processing device is configured to determine the analysis area ([BB]) based on the pose prediction data (PPD).

Clause 2. The processing device of clause 1, which is further configured to determine, based on the pose prediction data (PPD), a predicted pose of the object at a time point associated with the respective image, wherein the processing device is configured to determine the analysis area ([BB]) based on the predicted pose.

Clause 3. The processing device of clause 2, wherein the analysis area ([BB]) is defined as a bounding box that surrounds the predicted pose when the predicted pose is spatially matched to the image.

Clause 4. The processing device of clause 2 or 3, which is configured to determine the predicted pose of the object at a time point associated with the respective image by temporally interpolating two or more predicted poses in the pose prediction data (PPD).

Clause 5. The processing device of any preceding clause, wherein the predicted poses in the pose prediction data (PPD) are defined in a 3D coordinate system (30) associated with the scene, wherein the processing device is further configured to: spatially match the predicted poses to the image by projecting the predicted poses into a 2D coordinate system (32) associated with the respective image.

Clause 6. The processing device of any one of clauses 1-4, wherein the predicted poses in the pose prediction data (PPD) are defined in a 2D coordinate system (32) associated with the respective image.

Clause 7. The processing device of any preceding clause, which is further configured to: process locations of the predefined features that are detected within the analysis area ([BB]) for the respective image to determine a detected 2D pose of the object.

Clause 8. The processing device of clause 7, wherein the pose prediction data (PPD) defines a branching time point (BTP), which separates a progressing time sequence of predicted poses into two or more alternative sequences of poses, wherein the processing device is further configured to: perform an evaluation of the detected 2D pose of the object in an image associated with a time point at or near the branching time point (BTP) in relation to predicted poses in the two or more alternative sequences, select one of the alternative sequences based on the evaluation, and determine the predicted pose of the object based on said one of the alternative sequences.

Clause 9. The processing device of any preceding clause, which is further configured to: evaluate the predefined features that are detected within the analysis area ([BB]) for the respective image in relation to at least one predicted pose in the pose prediction data (PPD).

Clause 10. The processing device of any preceding clause, which is configured to determine, by processing the respective image within the analysis area ([BB]), a set of candidate locations of the predefined features in the respective image and confidence values for the candidate locations, and wherein the processing device is configured to: selectively modify the confidence values based on locations of corresponding predefined features in the at least one predicted pose in the pose prediction data (PPD), and determine a set of detected locations of the predefined features in the respective image based on the selectively modified confidence values.

Clause 11. The processing device of clause 10, wherein the set of candidate locations and the confidence values are given as confidence maps that indicate a confidence value of a respective predefined feature being located at a respective candidate location in the image.

Clause 12. The processing device of any preceding clause, further comprising the image sensor (51).

Clause 13. The processing device of any preceding clause, which is further configured to determine a sequence of 3D poses ([3D]) of the object based on images of the scene captured by a plurality of image sensors, and generate the pose prediction data based on the sequence of 3D poses ([3D]).

Clause 14. A system comprising a plurality of processing devices according to any preceding clause, wherein the processing devices are configured to obtain a respective sequence of images of the scene from a respective image sensor (51), the system further comprising a prediction module (63), which is configured to generate the pose prediction data (PPD) and provide the pose prediction data (PPD) to the plurality of processing devices.

Clause 15. The system of clause 14, wherein the prediction module (63) is configured to operate a pose prediction algorithm on a sequence of 3D poses ([3DP]) of the object to determine predicted 3D poses ([3DP]*) of the object as a function of time within a prediction time window (PTW), and to generate the pose prediction data (PPD) to represent at least a subset of the predicted 3D poses ([3DP]*).

Clause 16. The system of clause 15, further comprising a triangulation module (61) which is configured to obtain sequences of detected 2D poses from the plurality of processing devices, and to calculate the sequence of 3D poses ([3DP]) of the object by operating a triangulation algorithm on time-synchronized 2D poses among the sequences of detected 2D poses.

Clause 17. The system of clause 16, wherein the triangulation module (61) and the prediction module (63) are physically separated from the processing device.

Clause 18. The system of clause 16 or 17, wherein each of the processing devices is configured to transfer a sequence of detected 2D poses corresponding to the sequence of images to the triangulation module (61).

Clause 19. The system of clause 18, further comprising an estimation module (64), which is configured to estimate a latency period (LT) from a transfer of the sequence of detected 2D poses from one of the processing devices to a receipt of the pose prediction data (PPD) by said one of the processing devices, wherein the prediction module (63) is configured to generate the pose prediction data (PPD) based on the latency period (LT).

Clause 20. The system of clause 19, wherein the prediction module (63) is configured to set the prediction time window (PTW) based on the latency period (LT).

Clause 21. The system of any one of clauses 16-20, wherein at least a subset of the processing devices is further configured to, intermittently, process one or more images in the sequence of images for detection of new objects and determine one or more 2D poses for a respective new object that is detected in the one or more images, and wherein said at least a subset of the processing devices is configured to transmit the one or more 2D poses for the respective object to the triangulation module (61).

Clause 22. The system of any one of clauses 15-21, which is configured to store, output or process the sequence of 3D poses ([3DP]).

Clause 23. A computer-implemented method for image processing, said method comprising: obtaining (201) a sequence of images of a scene captured by an image sensor (51); determining (202) an analysis area for an object in a respective image in the sequence of images; and processing (204) the respective image within the analysis area for detection of predefined features of the object; wherein the method further comprises receiving (202A) pose prediction data (PPD) which represents predicted poses of the object as a function of time, wherein the analysis area is determined (202B) based on the pose prediction data (PPD).

Clause 24. A processing device configured to: obtain a sequence of images of a scene captured by an image sensor (51); process the respective image for detection of predefined features of an object; receive pose prediction data (PPD) which represents predicted poses of the object as a function of time; and evaluate the predefined features that are detected for the respective image in relation to at least one predicted pose in the pose prediction data (PPD) to determine a pose of the object.

Clause 25. A computer-implemented method for image processing: comprising: obtaining (201) a sequence of images of a scene captured by an image sensor (51); processing (204) the respective image for detection of predefined features of an object; receiving (205A) pose prediction data (PPD) which represents predicted poses of the object as a function of time; and evaluating (205B) the predefined features that are detected for the respective image in relation to at least one predicted pose in the pose prediction data (PPD), to determine a pose of the object.

Clause 26. A computer-readable medium comprising computer instructions (102A) which, when executed by a processor (101), cause the processor (101) to the perform the method of clause 23 or 25.

The invention claimed is:

1. A processing device configured to: obtain a sequence of images of a scene captured by an image sensor; determine an analysis area for an object in a respective image in the sequence of images; and process the respective image within the analysis area for detection of predefined features of the object, wherein the processing device is further configured to receive pose prediction data which comprises a parametric representation of predicted poses of the object as a function of time, wherein the parametric representation includes a movement pattern of the object over time, and wherein the processing device is configured to determine the analysis area based on the pose prediction data.

2. The processing device of claim 1, which is further configured to determine, based on the pose prediction data, a predicted pose of the object at a time point associated with the respective image, wherein the processing device is configured to determine the analysis area based on the predicted pose.

3. The processing device of claim 2, wherein the analysis area is defined as a bounding box that surrounds the predicted pose when the predicted pose is spatially matched to the image.

4. The processing device of claim 2, which is configured to determine the predicted pose of the object at a time point associated with the respective image by temporally interpolating two or more predicted poses in the pose prediction data.

5. The processing device of claim 1, wherein the predicted poses in the pose prediction data are defined in a 3D coordinate system associated with the scene, wherein the processing device is further configured to: spatially match the predicted poses to the image by projecting the predicted poses into a 2D coordinate system associated with the respective image.

6. The processing device of claim 1, wherein the predicted poses in the pose prediction data are defined in a 2D coordinate system associated with the respective image.

7. The processing device of claim 1, which is further configured to: process locations of the predefined features that are detected within the analysis area for the respective image to determine a detected 2D pose of the object.

8. The processing device of claim 7, wherein the pose prediction data defines a branching time point, which separates a progressing time sequence of predicted poses into two or more alternative sequences of poses, wherein the processing device is further configured to:
perform an evaluation of the detected 2D pose of the object in an image associated with a time point at or near the branching time point in relation to predicted poses in the two or more alternative sequences, select one of the alternative sequences based on the evaluation, and determine the predicted pose of the object based on said one of the alternative sequences.

9. The processing device of claim 1, which is further configured to: evaluate the predefined features that are detected within the analysis area for the respective image in relation to at least one predicted pose in the pose prediction data.

10. The processing device of claim 1, which is configured to determine, by processing the respective image within the analysis area, a set of candidate locations of the predefined features in the respective image and confidence values for the candidate locations,
and wherein the processing device is configured to: selectively modify the confidence values based on locations of corresponding predefined features in the at least one predicted pose in the pose prediction data, and determine a set of detected locations of the predefined features in the respective image based on the selectively modified confidence values.

11. The processing device of claim 10, wherein the set of candidate locations and the confidence values are given as confidence maps that indicate a confidence value of a respective predefined feature being located at a respective candidate location in the image.

12. The processing device of claim 1, which is further configured to determine a sequence of 3D poses of the object based on images of the scene captured by a plurality of image sensors, and generate the pose prediction data based on the sequence of 3D poses.

13. A system comprising a plurality of processing devices according to claim 1, wherein the processing devices are configured to obtain a respective sequence of images of the scene from a respective image sensor, the system further comprising a prediction module, which is configured to generate the pose prediction data and provide the pose prediction data to the plurality of processing devices.

14. The system of claim 13, wherein the prediction module is configured to operate a pose prediction algorithm on a sequence of 3D poses of the object to determine predicted 3D poses of the object as a function of time within a prediction time window, and to generate the pose prediction data to represent at least a subset of the predicted 3D poses.

15. The system of claim 14, further comprising a triangulation module which is configured to obtain sequences of detected 2D poses from the plurality of processing devices, and to calculate the sequence of 3D poses of the object by operating a triangulation algorithm on time-synchronized 2D poses among the sequences of detected 2D poses.

16. The system of claim 15, wherein the triangulation module and the prediction module are physically separated from the processing device, and wherein each of the processing devices is configured to transfer a sequence of detected 2D poses corresponding to the sequence of images to the triangulation module.

17. The system of claim 16, further comprising an estimation module, which is configured to estimate a latency period from a transfer of the sequence of detected 2D poses from one of the processing devices to a receipt of the pose prediction data by said one of the processing devices, wherein the prediction module is configured to generate the pose prediction data based on the latency period.

18. The system of claim 17, wherein the prediction module is configured to set the prediction time window based on the latency period.

19. A computer-implemented method for image processing, said method comprising: obtaining a sequence of images of a scene captured by an image sensor;
determining an analysis area for an object in a respective image in the sequence of images; and
processing the respective image within the analysis area for detection of predefined features of the object; wherein the method further comprises receiving pose prediction data which comprises a parametric representation of predicted poses of the object as a function of time,
wherein the parametric representation includes a movement pattern of the object over time, and
wherein the analysis area is determined based on the pose prediction data.

20. A processing device configured to: obtain a sequence of images of a scene captured by an image sensor; process the respective image for detection of predefined features of an object; receive pose prediction data which comprises a parametric representation of predicted poses of the object as a function of time, wherein the parametric representation includes a movement pattern of the object over time; and evaluate the predefined features that are detected for the respective image in relation to at least one predicted pose in the pose prediction data to determine a pose of the object.

* * * * *